United States Patent  (10) Patent No.: US 9,436,766 B1
Buryak  (45) Date of Patent: Sep. 6, 2016

(54) CLUSTERING OF DOCUMENTS FOR PROVIDING CONTENT

(71) Applicant: Kirill Buryak, Sunnyvale, CA (US)

(72) Inventor: Kirill Buryak, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 749 days.

(21) Appl. No.: 13/679,732

(22) Filed: Nov. 16, 2012

(51) Int. Cl.
  *G06F 17/30* (2006.01)
(52) U.S. Cl.
  CPC ............... *G06F 17/30867* (2013.01)
(58) Field of Classification Search
  CPC ............ G06F 17/30867; G06Q 30/0267
  See application file for complete search history.

(56) References Cited

U.S. PATENT DOCUMENTS

| | | | |
|---|---|---|---|
| 7,493,372 B2 | 2/2009 | Crabtree et al. | |
| 7,502,971 B2* | 3/2009 | Cohen et al. | 714/45 |
| 2009/0043739 A1 | 2/2009 | Choi | |
| 2010/0030648 A1* | 2/2010 | Manolescu et al. | 705/14.66 |
| 2011/0035381 A1 | 2/2011 | Thompson et al. | |
| 2012/0066073 A1* | 3/2012 | Dilip et al. | 705/14.66 |
| 2012/0102008 A1* | 4/2012 | Kaariainen et al. | 707/705 |
| 2012/0110071 A1* | 5/2012 | Zhou et al. | 709/204 |

FOREIGN PATENT DOCUMENTS

WO  WO-2011/011398 A2  1/2011

OTHER PUBLICATIONS

Jakob Uszkoreit and Thorsten Brants, Distributed Word Clustering for Large Scale Class-Based Language Modeling in Machine Translation, Proceedings of ACL-08: HLT, pp. 755-762, 2008 [retrieved on Jul. 10, 2015]. Retrieved from the Internet: http://www.aclweb.org/anthology/P08-1086.*

* cited by examiner

*Primary Examiner* — Boris Gorney
*Assistant Examiner* — Kris Andersen
(74) *Attorney, Agent, or Firm* — Foley & Lardner LLP; John D. Lanza; James De Vellis

(57) ABSTRACT

Systems and methods for providing relevant content may include applying a clustering algorithm to posts associated with a device identifier and labeled documents to cluster the unlabeled posts with the labeled documents to determine interests. Content related to the interests may be selected and provided to an electronic device associated with the device identifier.

19 Claims, 7 Drawing Sheets

CLUSTERING OF DOCUMENTS FOR PROVIDING CONTENT

BACKGROUND

Some resources, such as web sites, permit users to post or otherwise provide content for an associated portion of the resource, such as a web page. These users may generate a large amount of unstructured content that implicitly or explicitly indicate each user's interests. The resource may further allow third-party content providers to provide third-party content items resources. Third party content providers may include advertisers or other providers of goods and/or services. For example, a first-party content provider of a resource devoted to golf may allow an online retailer that sells golf clubs to place third-party content items on the resource. In return, the third-party content provider may compensate the first-party content provider based on one or more measurements of traffic to the resource. In one example, the third-party content provider may pay the first-party content provider based on the number of impressions, i.e., the number of times the third-party content items were displayed on the resource to users. In another example, the third-party content provider may pay the first-party content provider based on the number of users that clicked on the third-party content items and were redirected to the third-party content provider's resource and/or made a purchase from the third-party content provider's resource.

SUMMARY

Implementations of the systems and methods for providing relevant online content are described herein. One implementation is a computerized method for associating an interest with a first device identifier. The method can include receiving, at one or more processing systems, a post from a social network associated with a device identifier. The one or more processing systems may determine one or more keywords of the post and may associate the post with an entry of a labeled document set based upon the keyword(s) of the post. The one or more processing systems may determine an interest of the posted based upon the association of the post with the entries that are associated with a known interest. The interest may be associated with the device identifier such that a request from a user device associated with the device identifier to effect the display of content on a user device associated with the device identifier, such as an advertisement, may be provided based, at least in part, on the interest.

In another implementation, a system for selecting user content may include one or more processing modules operable to receive data indicative of a post to a social network that is associated with a device identifier. The one or more processing modules may be further operable to receive data indicative of one or more labeled documents each associated with a known interest. The one or more processing modules may determine keywords for the post and the labeled documents. Using these keywords, the one or more processing modules may associate the post with one or more of the labeled documents. This association may permit an interest of the post to be determined and for data to effect the display of content on a user device associated with the device identifier based, in part, on the interest.

In yet another implementation, a computerized method for associating interests with a device identifier may include one or more processing systems receiving posts associated with the device identifier from a social network and labeled document sets associated with known interests. Each labeled document may have one or more entries associated with an interest. The one or more processing systems may determine keywords for the posts and entries to generate one or more clusters of posts and/or entries. The one or more processing systems may determine an interest of one or more posts based upon the relevant cluster. The interest may be associated with the device identifier to effect the display of content on a user device associated with the device identifier related to the interest in response to a request from a user device.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

I. Overview

Figure 1:
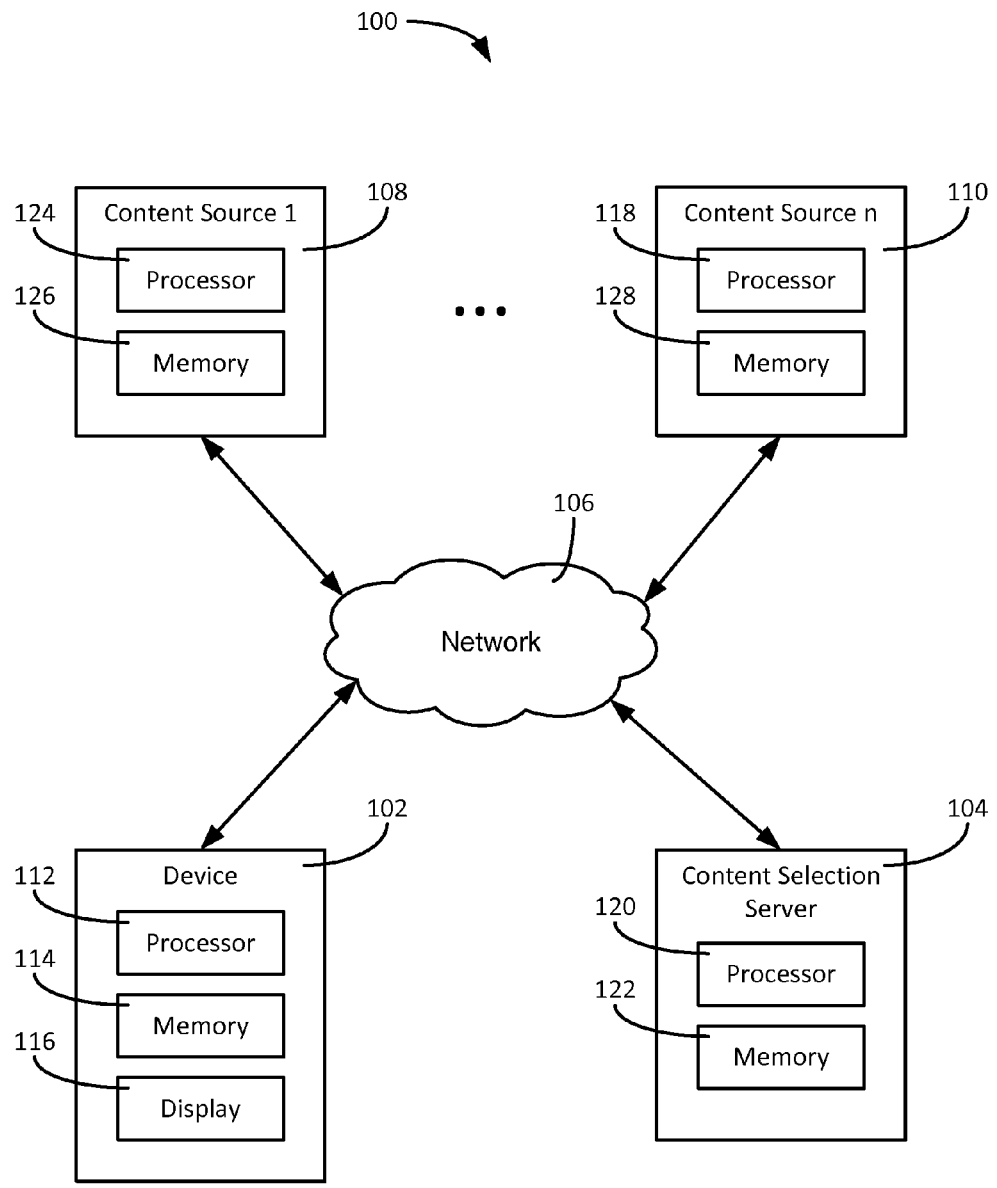
FIG. 1 is a block diagram of a computer system in accordance with a described implementation.

According to some aspects of the present disclosure, a user may consent to the use of data to be used for receiving content that may be of interest to the user. Content may include advertisements for goods and/or services or other content. In various implementations, a user may allow certain information about the user's online behavior to be stored and analyzed, to determine topics that may be of interest to the user. For example, history data regarding resources visited by the user, comments, or other content uploaded by a user, and other online actions may be analyzed to determine topics of interest to the user.

For situations in which the systems discussed here collect information about users, or may make use of information about users, the users may be provided with an opportunity to control whether programs or features that may collect user information (e.g., information about a user's social network, social actions or activities, a user's preferences, or a user's current location), or to control whether and/or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, users may have control over how information is collected about them and used by a content server.

In various implementations, an interest of a user may be determined by analyzing the online postings, comments, or other user-generated content expressed by the user. For example, golf may be determined as an interest of a user that discusses various golf courses, golf clubs, or other associated topics. In one implementation, text written by a user may be analyzed to determine a user's interests. For example, an email, online article, blog entry, comment, or similar text from the user may be analyzed to discern the user's interests. In one implementation, a user's interactions via a social networking system may be analyzed to determine potential interests of the user. In general, a social networking system refers to any computerized platform that allows a user to create a profile and associate the profile with that of other users whom the user deems as social connections or with groups of interest to the user. For example, a user may associate her profile with that of her friends, family, co-workers, classmates, or the like. Actions performed by the user within the social networking system may also be analyzed to determine the user's interests. For example, groups joined by the user, content recommended by the user to other users, links provided by the user, comments by the user on other users' posts, comments by other users' on the user's posts, ratings provided by the user, and similar actions may be analyzed to determine the interests of the user. Such interests may be utilized to provide suggestions of interest groups associated with the user's interests, suggestions of others users to connect with, or to provide other content relevant to the user's interests.

In some implementations, a first-party content provider may participate in an advertising or other content network. Participating in such a network may allow any number of different forms of third-party content to be presented with a resource of the first-party provider. For example, the resource may be modified to cause a user's device to retrieve content, such as an advertisement, from a server of the content network (e.g., from a different source than that of the resource, such as an advertisement network or agency). The retrieved third-party content may then be displayed as being part of the resource or in conjunction with the display of the resource (e.g., in another browser tab, in a pop-up window, etc.). For example, an advertisement may be retrieved and displayed when a web page is loaded. Different third-party content may be selected by the server of the content network. For example, the resource may display a first advertisement to a first user and a second advertisement to a second user. In this way, different third-party content providers can provide different third-party content items for a particular resource, without the first-party content provider having to modify the code of the resource each time a new content item is to be displayed.

Third-party content provided by a content network, for example an advertisement provided by an advertisement network or agency, may be selected based on whether the third-party content is deemed to be relevant to a particular user associated with a device identifier. Rather than selecting a content item to be provided on a resource based on the content of the resource itself, the selection of third-party content may take into account the interest associated with a user associated with a device identifier. For example, a device identifier may be associated with visiting a resource of an online retailer, which may in turn be associated with an interest in knowing when the retailer is running a sale. The association of the device identifier with the interest may then be used to select an advertisement for such a sale, regardless of the content of the resource being displayed to a user of the user device associated with the device identifier. For example, assume that a user using a user device associated with a device identifier visits a resource of an online retailer of golf clubs and then visits a resource devoted to finance. The device identifier may be associated with an interest in golf, based on the visit to the retailer's resource. When the user device associated with the device identifier is used to visit the financial resource, a content item for a sale on golf clubs may be provided for display on the user device, even though the financial resource is unrelated to golf.

II. Overview of Computer System

Referring to FIG. 1, a block diagram of a computer system 100 in accordance with a described implementation is shown. System 100 includes a user device 102 which communicates with other computing devices via a network 106. User device 102 may execute a web browser or other application to retrieve and display resources and content from other devices over network 106. For example, user device 102 may communicate with any number of content sources 108, 110 (e.g., a first content source through n-th content source). Content sources 108, 110 may provide resource data and/or other content (e.g., text documents, PDF files, and other forms of electronic documents) to user device 102. In some implementations, computer system 100 may also include a content selection server 104 that provides third-party content to other devices in computer system 100. For example, content source 108 may provide resource data to user device 102 that causes user device 102 to retrieve a content item, such as an advertisement or other form of third-party content, from content selection server 104. In this way, the same resource from content source 108 may display any number of different content items provided by content selection server 104. In another example, user device 102 may execute a non-browser application (e.g., a game, a stand-alone social networking application, etc.) that receives third-party content items from content selection server 104.

Network 106 may be any form of computer network that relays information between user device 102, content sources 108, 110, and content selection server 104. For example, network 106 may include the Internet and/or other types of data networks, such as a local area network (LAN), a wide area network (WAN), a cellular network, satellite network, or other types of data networks. Network 106 may also include any number of computing devices (e.g., computer, servers, routers, network switches, etc.) that are configured to receive and/or transmit data within network 106. Network 106 may further include any number of hardwired and/or wireless connections. For example, user device 102 may communicate wirelessly (e.g., via WiFi, cellular, radio, etc.) with a transceiver that is hardwired (e.g., via a fiber optic cable, a CAT5 cable, etc.) to other computing devices in network 106.

User device 102 may be of any number of different types of user electronic devices configured to communicate via network 106 (e.g., a laptop computer, a desktop computer, a tablet computer, a smartphone, a digital video recorder, a set-top box for a television, a video game console, combinations thereof, etc.). User device 102 is shown to include a processor 112 and a memory 114, i.e., a processing module. Memory 114 may store machine instructions that, when executed by processor 112 cause processor 112 to perform one or more of the operations described herein. Processor 112 may include a microprocessor, ASIC, FPGA, etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ROM, RAM, EEPROM, EPROM, flash memory, optical media, or any other suitable memory from which processor 112 can read instructions. The instructions may include code from any suitable computer programming language such as, but not limited to, C, C++, C#, JavaScript, Perl, HTML, XML, Python and Visual Basic.

User device 102 may include one or more user interface devices. A user interface device may be any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to the housing of user device 102 (e.g., a built-in display, microphone, etc.) or external to the housing of user device 102 (e.g., a monitor connected to user device 102, a speaker connected to user device 102, etc.), according to various implementations. For example, user device 102 may include an electronic display 116, which displays resources and other electronic documents received from content sources 108, 110, and/or third-party content selected by content selection server 104.

Content sources 108, 110 may be one or more electronic devices connected to network 106 that provide content to user device 102. For example, content sources 108, 110 may be computer servers (e.g., FTP servers, file sharing servers, web servers, etc.) or a combination of servers (e.g., data centers, cloud computing platforms, etc.). Content may include, but is not limited to, web page data, a text file, a spreadsheet, images, and other forms of electronic documents. Similar to user device 102, content sources 108, 110 may include processing modules having processors 124, 118 and memories 126, 128, respectively, that store program instructions executable by processors 124, 118. For example, the processing module of content source 108 may include instructions such as web server software, FTP serving software, and other types of software that cause content source 108 to provide content via network 106.

In some implementations, one or more of content sources 108, 110 may be part of a social networking system. For example, the user of user device 102 may create a user profile on content source 110 and associate it with other user profiles belonging to the user's social connections. In such a case, content source 110 may allow users of the social networking system to upload content (e.g., images, text, video, etc.), share content with social connections, join groups devoted to certain interests (e.g., a group devoted to parasailing, a group including a user's classmates, etc.), rate content (e.g., positively rate an image uploaded by another user, etc.), or any other action associated with a social networking system. In one implementation, some or all of the functions of a social networking system may be extended to other content sources. For example, assume that content source 110 hosts a social networking web site and that content source 108 hosts another web site. In such a case, the web site served by content source 108 may be modified to allow users of the social networking site of content source 110 to perform social networking-related actions relating to the content of content source 108 (e.g., rating the content, sharing the content with social connections, commenting on the content, etc.).

According to various implementations, content sources 108, 110 may provide commands to user device 102 that cause user device 102 to retrieve a third-party content item, such as an advertisement, or other form of third-party content item from content selection server 104. For example, content sources 108, 110 may provide resource data to user device 102 that includes one or more content tags. In general, a content tag may be any piece of web page code associated with placing a content item into the resource. A content tag may define a slot on a resource for a third-party content item, a slot for an out of page content item (e.g., an interstitial advertisement slot), whether third-party content items should be loaded asynchronously or synchronously, whether the loading of third-party content items should be disabled on the resource, whether third-party content item that loaded unsuccessfully should be refreshed, the network location of a server that provides third-party content items (e.g., content selection server 104), a network location (e.g., a URL) associated with clicking on a content item, how third-party content item is to be rendered for display by the user device, one or more keywords used to retrieve a third-party content item, and/or other functions associated with providing a third-party content item for a resource. For example, content source 108 may provide resource data that causes user device 102 to retrieve a third-party content item from content selection server 104. In another implementation, the third-party content item may be provided by content selection server 104 to content source 108 and provided as part of the resource data sent to user device 102. In a further implementation, user device 102 may independently request third-party content items from content selection server 104 or content selection server 104 may push third-party content items to user device 102 without first receiving such a request (e.g., as part of a game or other non-browser application).

Similar to content sources 108, 110, content selection server 104 may be one or more electronic devices connected to network 106 that select third-party content items to be displayed by user device 102 to a user. Content selection server 104 may be computer servers (e.g., FTP servers, file sharing servers, web servers, etc.) or a combination of servers (e.g., a data center, a cloud computing platform, etc.). Content selection server 104 may include a processing module including a processor 120 and a memory 122 that stores program instructions executable by processor 120. For example, the processing module of content selection server 104 may be configured to provide third-party content items to user device 102 when user device 102 requests resources served by content sources 108, 110. According to various implementations, content selection server 104 may be configured to select third-party content items, such as advertisements, for user device 102 based in part on potential interests associated with a device identifier associated with user device 102, as described in greater detail herein.

A user of user device 102 may permit the use of user data to allow content selection server 104 and/or content sources 108, 110 to determine and store history data relating to user device 102. For example, the user may consent to receiving third-party content items from content selection server 104 that may be relevant to the user. In various implementations, a device identifier may be used to represent the user in system 100 and associated with the stored history data. The device identifier (e.g., a cookie, an IP address, a device ID, a username and/or password, etc.) may be used by content selection server 104, and/or content sources 108, 110 to identify user device 102. In some implementations, a device identifier may be associated with multiple user devices 102. For example, a user of user device 102 may access content sources 108, 110 and/or content selection server 104 using a number of different devices (e.g., a mobile phone, a home computer, etc.).

A device identifier may be associated with one or more interest categories, based on the history data associated with the device identifier. For example, if the device identifier is associated with visiting a resource devoted to baseball, the device identifier may be associated with the interest category of baseball. In various implementations, content selection server 104 and/or content sources 108, 110 may be configured to determine an interest associated with a device identifier, select third-party content items having a topic that matches the interest, and/or cause the third-party content items to be displayed on the user device 102.

In addition, or in the alternative, various online actions associated with a device identifier may be analyzed by content selection server 104 and/or by content source 108, 110, to determine an interest category to be associated with the device identifier. For example, content selection server 104 may analyze ratings, posts, comments, suggestions, social connections, groups, etc. to determine one or more interest categories. In some implementations, content sources 108, 110 may be configured to determine interests and provide the determined interests to content selection server 104. Such interests and the presentation of content to the user will be described in greater detail herein.

III. Example Resource and Third-Party Content Item Retrieval

Figure 2:
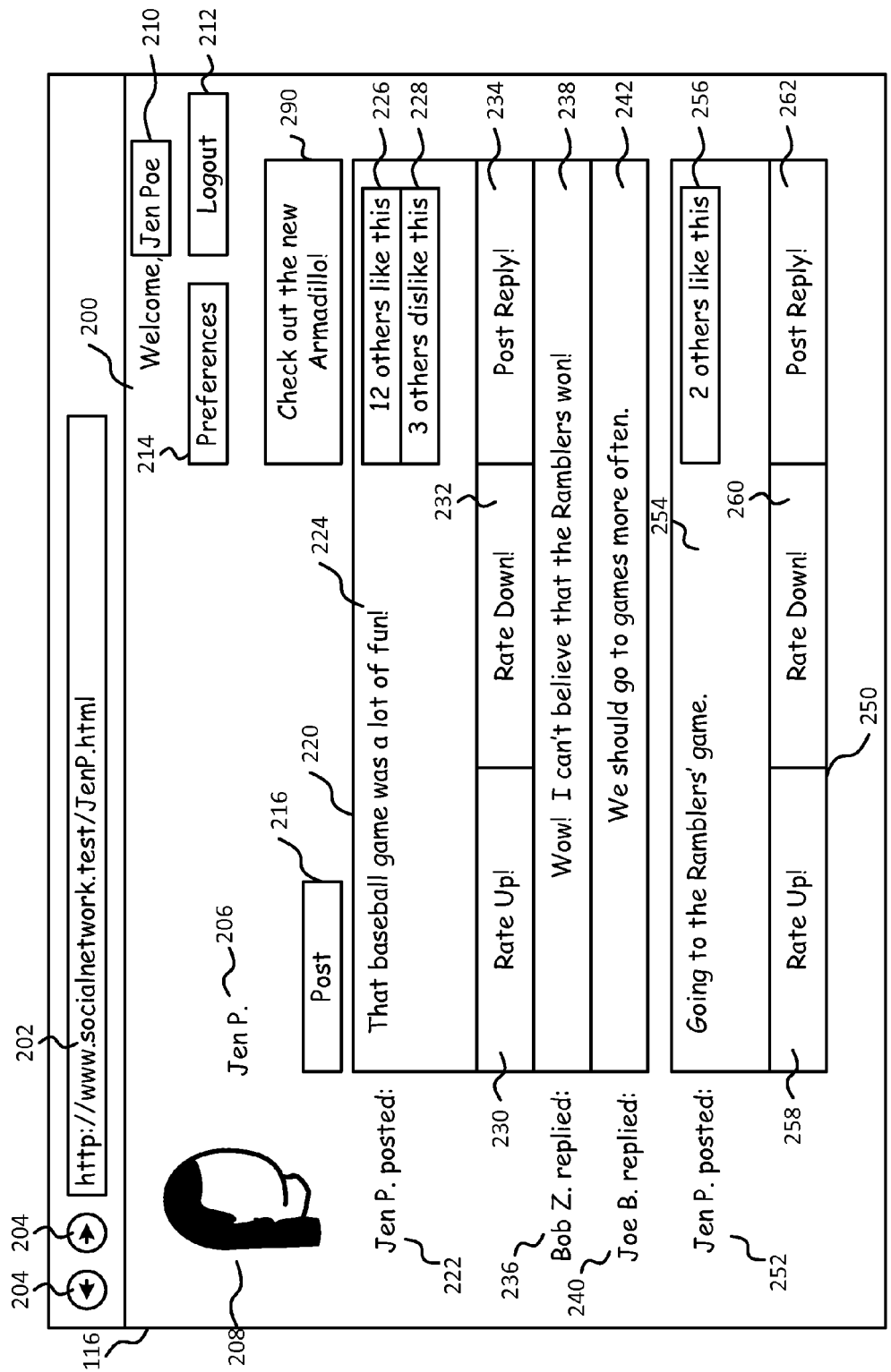
FIG. 2 is an example illustration of an electronic display showing an example resource having posts associated with identifiers.

Referring now to FIG. 2, an illustration is shown of an electronic display 116 displaying an example resource 200 for a social networking environment. Electronic display 116 is in electronic communication with processor 112, shown in FIG. 1, which causes visual indicia to be displayed on electronic display 116. For example, processor 112 may execute a web browser or other application stored in memory 114 of user device 102 to display indicia of content received by user device 102 via network 106. In various implementations, electronic display 116 may be located inside or outside of the same housing as that of processor 112 and/or memory 114. For example, electronic display 116 may be an external display, such as a computer monitor, television set, or any other stand-alone form of electronic display. In other examples, electronic display 116 may be integrated into the housing of a laptop computer, mobile device, or other form of computing device having an integrated display.

As shown, processor 112 may execute a web browser application and provide display data to electronic display 116. In one implementation, the web browser application may operate by receiving input of a uniform resource locator (URL) via a field 202 from an input device (e.g., a pointing device, a keyboard, a touchscreen, etc.). For example, the URL http://www.socialnetwork.test/JenP.html may be entered into field 202. Processor 112 may use the entered URL to request data from a content source having a network address that corresponds to the entered URL. In response to the request, the content source may return resource data and/or other data to user device 102 which may be used by user device 102 to cause visual indicia to be displayed by electronic display 116.

In general, resource data may include text, hyperlinks, layout information, and other data that may be used to provide the framework for the visual layout of displayed resource 200. In some implementations, resource data may be one or more files of web page code written in a markup language, such as the hypertext markup language (HTML), extensible HTML (XHTML), extensible markup language (XML), or any other markup language. For example, the web page data in FIG. 2 may include a file, "JenP.html" provided by the web site, "www.socialnetwork.test." The resource data may include data that specifies where indicia, such as text 206, appears on resource 200. In some implementations, the resource data may also include additional URL information used by the user device to retrieve additional indicia displayed on resource 200. For example, the file, "JenP.html," may also include one or more instructions used by processor 112 to retrieve image 208 from the content source. In another example, the resource data may include one or more content tags that cause processor 112 to retrieve one or more third-party content items, such as advertisement 290, from a content selection server, such as content selection server 104.

The web browser displayed on electronic display 116 may include a number of navigational controls associated. For example, the web browser may include the ability to go back or forward to other resources using inputs 204 (e.g., a back button, a forward button, etc.). The web browser may also include one or more scroll bars (not shown), which can be used to display parts of resource 200 that are currently off-screen. For example, resource 200 may be formatted to be larger than the screen of electronic display 116. In such a case, the one or more scroll bars may be used to change the vertical and/or horizontal position of resource 200 on electronic display 116.

Resource 200 may include text, images, or other forms of indicia to convey information to a user of user device 102. For example, a textual identifier 206 may indicate that resource 200 provides information about the name of the user's profile on the social networking environment. Similarly, image 208 may provide information about the visual appearance of the user. Any combination of text, images, and/or other files may be used by resource 200 to convey information to a user.

In one implementation, resource 200 may include third-party content item 290 which is selected by content selection server 104. For example, one or more content tags may be embedded into the resource code located in the file "JenP.html" and/or in other files of resource 200. In other words, "JenP.html" may include a content tag that specifies that a third-party content field is to be located at the position of third-party content item 290. Another content tag may cause processor 112 to request a third-party content item from content selection server 104, when resource 200 is loaded. Such a request may include one or more keywords, an interest associated with the device identifier, a device identifier for user device 102, and/or other data used by content selection server 104 to select a third-party content item to provide to user device 102. In this way, any number of different third-party content items may be placed in the location of third-party content item 290 on resource 200. In other words, one user that requests resource 200 may be presented with third-party content item 290 and a second user that requests resource 200 may be presented with a different third-party content item In some implementations, third-party content item 290 may be selected based in part on its relevancy to the device identifier associated with the user device requesting resource 200. For example, third-party content item 290 may be selected using a device identifier provided to content selection server 104 when user device 102 requests a third-party content item. Such an identifier may be associated with one or more interests. In various implementations, an interest may be determined based in part on one or more posts by the user of user device 102. For example, assume that the user of user device 102 posted about attending a baseball game or expressed an opinion about a baseball team. In such a case, the post may be used to determine the general category of baseball, a certain team, a particular player, etc. as an interest associated with the device identifier. In some implementations, third-party content item 290 may be selected based on the interest associated with the device identifier. For example, third-party content item 290 may be selected by content selection server 104 to be placed on resource 200 based on the interest category of baseball associated with the device identifier.

In some implementations, resource 200 may be part of a social networking environment. In other implementations, some or all of the functions described with regard to resource 200 may be provided within another stand-alone application (e.g., a social networking application for a mobile device, an email program, etc.) and/or by a resource that incorporates social networking functions (e.g., a fan page that allows users to rate content on the resource, a resource that includes a function that allows users to recommend the resource to others, etc.).

Resource 200 may be configured to allow a user to interact with his or her user profile of a social networking environment. For example, assume that the user of user device 102 has logged into their social networking profile. In such a case, resource 200 may include an identifier 210 that conveys that the user, "Jen Poe," has logged into her profile. Identifier 210 may be associated with the device identifier of the user device accessing resource 200. Resource 200 may also include other profile-related inputs. For example, resource 200 may include a preferences input 214 configured to receive preferences associated with the user's profile. Example preferences include the display size, shape, color, font, etc., of resource 200, security preferences relating to how information about the user is shared with others, and other similar preferences. In some cases, resource 200 may include a logout input 212, configured to allow the user to log out of their social networking profile.

In one implementation, resource 200 may include an input 216 configured to allow the user of user device 102 to post text, hyperlinks, an uploaded or linked file (e.g., an image file, a video file, etc.), and/or other content to resource 200. For example, selection of input 216 by a user logged into his or her social networking profile may cause an entry field to be displayed such that text, hyperlinks, an uploaded or linked file (e.g., an image file, a video file, etc.), and/or other content may be transmitted to a server of the social networking environment. In response to receiving such a request, the server may add the text, images, hyperlinks, an uploaded or linked file (e.g., an image file, a video file, etc.), and/or other content to the resource associated with the profile of the user of user device 102. For example, posts 220, 250 are examples of such content that may be added to the profile of the user of user device 102. Posts 220, 250 include an identifier 222, 252 and a main post field 224, 254. Identifiers 222, 252 identify the user or other entity who submitted the post 220, 250. In some instances, identifiers 222, 252 may be associated with the device identifier of the user device displaying resource 200. Main post field 224, 254 includes the text, hyperlinks, an uploaded or linked file (e.g., an image file, a video file, etc.), and/or other content that was entered. In the present example, main post fields 224, 254 include text, though it should be understood that other content may be included in main post fields 224, 254. For example, in some implementations, main post fields 224, 254 may include an image or a hyperlink to another resource. It should be further understood that input 216 and posts 220, 250 need not be limited to a user's social networking profile page, but may be incorporated into an interest group page or otherwise. In a further implementation, input 216 may be provided on a third-party resource to permit a user to post or otherwise submit content while accessing the third-party resource.

Input 216 may be available to only the user whose profile the post will be added to, all users, users that are members of a social group associated with the user, or only those members authorized by an administrator to post, according to various implementations. Resource 200 may include some or all of the comments posted to the user's social networking profile. In some implementations, a comment entered via resource 200 may be displayed as part of another resource (e.g., a resource for an interest group, a resource for another user, a third-party resource, or the like).

In one implementation, a user may be associated with an identifier 222. Identifier 222 may be any form of unique data usable by the system to represent the user. Identifier 222 may be, for example, a device identifier, a unique identifier associated with one or more device identifiers, and/or login data for a social networking environment. For example, identifier 222 may include a screen name/password for the user, one or more device identifiers for user devices operated by the user, or similar data usable to attribute a particular online action to a specific user identifier. When the user posts, comments on a post, and/or performs other actions on the social network, the post, comment, and/or action may include such identification information to associate the post, comment, and/or action with identifier 222. For example, the user "Jen P." may be represented in the system by identifier 222 and may submit post 220 to resource 200. Post 220 may then be associated by the system with identifier 222. In such an implementation, the user "Jen P." associated with identifier 222 may also be associated with any replies, such as replies 238, 242, to post 220. In addition, or in the alternative, the user "Jen P." may be associated only with main content field 224 such that any replies are not associated with identifier 222. In the implementation shown in FIG. 3, user "Bob Z." may also be represented in the system by identifier 236 and reply 238 may be associated by the system with identifier 236. Similarly, user "Joe B." may also be represented in the system by identifier 240 and reply 242 may be associated by the system with identifier 240. Thus, the system may associate the originating user, such as "Jen P.," with the entirety of post 220 or only the user's part of the post, and may optionally associate users "Bob Z." and "Joe B." with replies 238, 242, respectively. In some implementations, the system may identify post 220 as a single document associated with identifier 222 for user "Jen P." and includes the main post field 224 and any replies 238, 242 to main post field 224. Several posts associated with identifier 222 may be aggregated to form a set (or corpus) of posts.

Posts 220, 250 also include rating inputs 230, 232, 258, 260 configured to increment or decrement counters associated with indicators 226, 228, 256. In some implementations, a user may rate the content or otherwise provide feedback relating to the post 220, 250. For example, a user may positively rate the content of main post field 224 via rating input 230, negatively rate the content of main post field 224 via rating input 232, post a reply to main post field 224 via input 234, and/or perform other actions. Ratings may be on a binary scale or a sliding scale (e.g., on a scale from one to ten, on a scale of A-F, etc.). Ratings may also be positive and/or negative. In some implementations, resource 200 may include indicators 226, 228, 256 configured to provide an aggregated count of positive and negative ratings, respectively. For example, indicators 226, 228, 256 may provide counts of the number of users that positively or negatively rated the content of main post fields 224, 254, an average positive or negative rating for the content of main post fields 224, 254, an aggregate positive or negative score for the content of main post fields 224, 254, or the like. In some implementations, indicators 226, 228, 256 may not appear on resource 200 until at least one rating is provided. For example, post 250 includes only indicator 256 associated with positive ratings while an indicator for negative ratings has been omitted because no negative ratings have occurred.

As noted above, resource 200 may include input 234 configured to allow a user to reply to the content of main post field 224. For example, another user, such as those associated and identified by identifiers 236, 240, may post a reply 238, 242 to main post field 224. Replies 238, 242 may include text, hyperlinks, an uploaded or linked file (e.g., an image file, a video file, etc.), and/or other content. In some implementations, rating inputs 230, 232 and indicators 226, 228 may also be associated with replies 238, 242 such that users may rate the content of replies 238, 242 in addition, or in the alternative, to rating the content of main post field 224.

In various implementations, content of posts 220, 250 on resource 200 may be associated with a device identifier and analyzed to determine one or more user interests, as will be described in greater detail below. Content that may be analyzed may include, but is not limited to, the content of main post field 224, 254, replies 238, 242, indicators 226, 228, 256, or the like. In various implementations, text analysis, image recognition, or other analysis of the content may be employed to determine topics or interests of resource 200, posts 220, 250, or the like. For example, image recognition may be used on an image to determine the content thereof.

Figure 3:
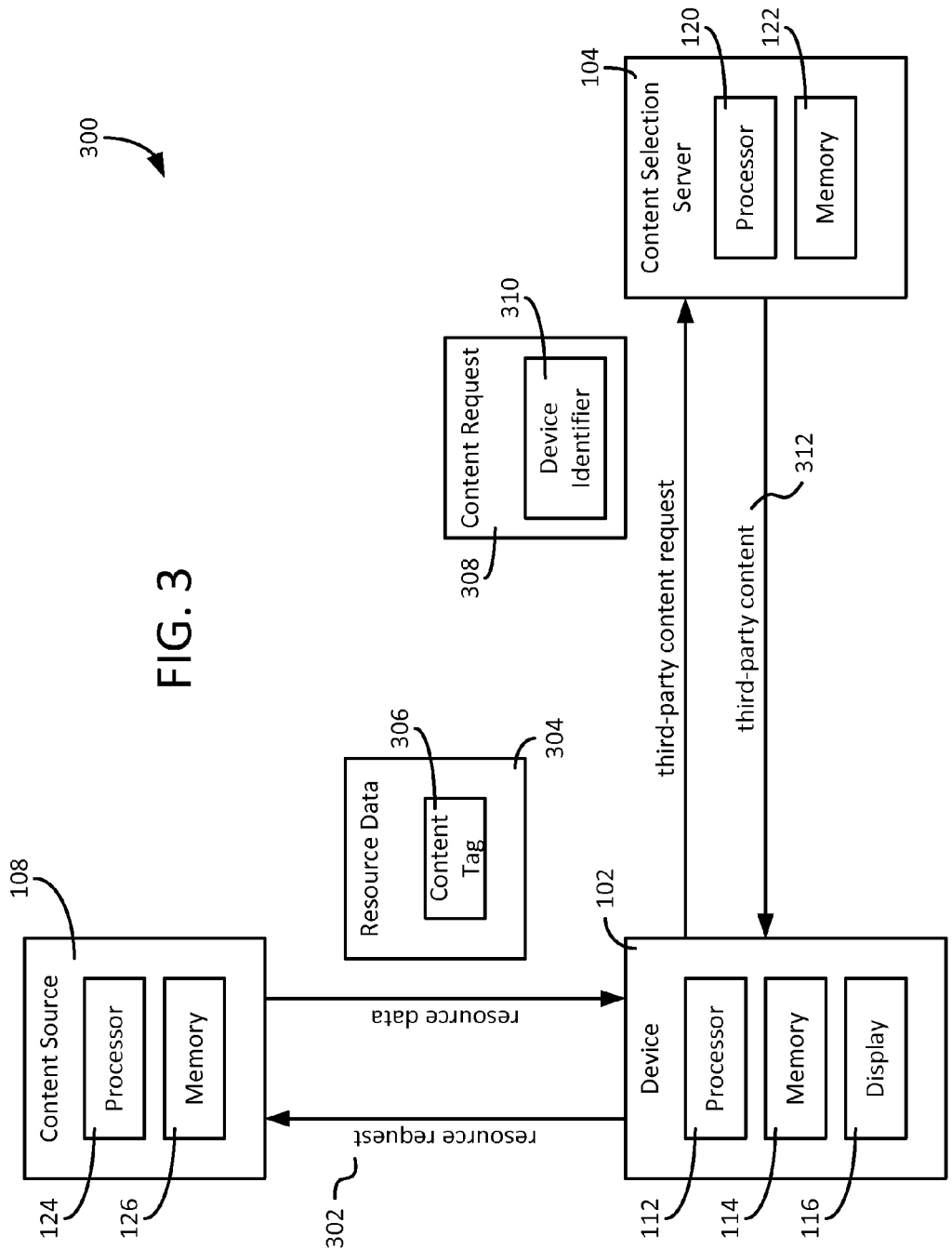
FIG. 3 is an example illustration of a third-party content being included on a resource.

FIG. 3 is an example illustration of a third-party content item 312 being selected for display with a resource, such as resource 200 shown in FIG. 2, by content selection server 104. As shown, user device 102 may send a resource request 302 to a content source via network 106, such as content source 108. For example, resource request 302 may be a request that conforms to the hypertext transfer protocol (HTTP), such as the following:

GET /JenP.html HTTP/1.1
Host: www.socialnetwork.test

Such a request may include the name of the file to be retrieved, JenP.html, as well as the network location of the file, www.socialnetwork.test. In some cases, a network location may be an IP address or may be a domain name that resolves to an IP address of content source 108. In some implementations, a device identifier, such as a cookie associated with content source 108, may be included with resource request 302 to identify user device 102 to content source 108.

In response to receiving resource request 302, content source 108 may return resource data 304, such as the requested file, "JenP.html." Resource data 304 may be configured to cause user device 102 to display a resource on electronic display 116 when opened by a web browser application. In some cases, resource data 304 may include code that causes user device 102 to request additional content to be displayed with the displayed resource. For example, resource data 304 may include an HTML image tag of the form:

<img src="Profile_picture.jpg">

Such code may cause user device 102 to request the image file "Profile_picture.jpg," from content source 108 such that the image file is displayed to the user, for example image 208 shown in FIG. 2.

In some implementations, resource data 304 may include content tag 306 configured to cause user device 102 to retrieve a third-party content item or other form of third-party content from content selection server 104. In some cases, content tag 306 may be an HTML image tag that includes the network location of content selection server 104. In other cases, content tag 306 may be implemented using a client-side scripting language, such as JavaScript. For example, content tag 306 may be of the form:

<script type='text/javascript'>
AdNetwork_RetrieveAd("argument")
</script> where AdNetwork_RetrieveAd is a script function that causes user device 102 to send a third-party content request 308 to content selection server 104. In some cases, the argument of the script function may include the network address of content selection server 104, the referring resource, and/or additional information that may be used by content selection server 104 to select a third-party content item to be included with the resource.

Third-party content request 308 may include a device identifier 310, used by content selection server 104 to identify user device 102. In various implementations, device identifier 310 may be an HTTP cookie previously set by content selection server 104 on user device 102, the IP address of user device 102, a unique device identifier for user device 102, login credentials, other forms of identification information, or combinations thereof. For example, content selection server 104 may set a cookie that includes a unique string of characters on user device 102 when a third-party content item is first transmitted to user device 102 by content selection server 104. Such a cookie may be included in subsequent third-party content item requests send to content selection server 104 by user device 102. Device identifier 310 may be associated with an identifier, such as identifier 222 described above, or may be used by content selection server 104, according to various implementations.

In response to receiving third-party content request 308, content selection server 104 may select third-party content item 312 to be returned to user device 102 and displayed with the resource requested from content source 108. For example, user device 102 may display third-party content item 290 on resource 200 shown in FIG. 2. Content selection server 104 may select third-party content item 312 based on device identifier 310, in some implementations. In some implementations, content selection server 104 may use, at least in part, the interests determined through process 400 and associated with a device identifier in the selection of third-party content item 312, as will be described in greater detail below. In various implementations, content selection server 104 may be configured to run a third-party content item auction in which third-party content providers compete to provide a third-party content item on the requested resource. For example, if travel is a determined interest for the device identifier, a third-party content provider that sells airline tickets may bid in such an auction to provide a third-party content item to the device identifier. In response to receiving third-party content item 312, user device 102 may display third-party content item 312 with the retrieved resource on electronic display 116. In other implementations, content selection server 104 may instead select third-party content items already stored on user device 102 and provide an indication of the selection to user device 102. In response, user device 102 may retrieve the pre-stored third-party content item from memory 114 and display the third-party content item with the displayed resource.

IV. Selecting Content Items Based on User Interests

Figure 4:
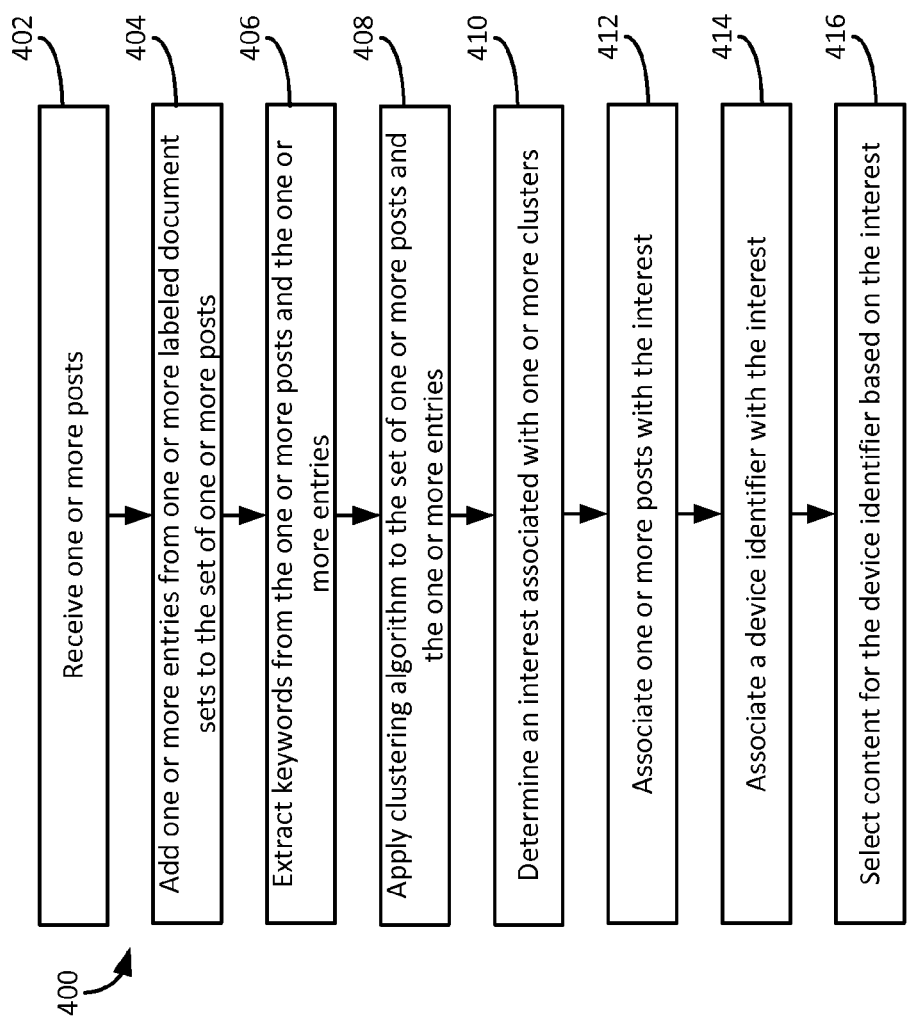
FIG. 4 is an example of a flow diagram of a method in accordance with a described implementation.

Referring now to FIG. 4, an example process 400 for selecting third-party content items is shown. In general, process 400 enables third-party content items to be selected based, at least in part, on one or more interests associated with a device identifier. Process 400 may be implemented by any number of computing devices. For example, process 400 may be implemented by a content selection server, such as content selection server 104 shown in FIG. 1. In another example, process 400 may be implemented by a content selection server working in conjunction with one or more content sources (e.g., a social networking server, another web server, etc.). In other implementations, process 400 may be implemented by a user device, such as user device 102 shown in FIG. 1.

Process 400 may include receiving one or more posts (block 402). Examples of such posts may include posts 220, 250 shown in FIG. 2. Such posts may be received by a content selection server, such as content selection server 104 shown in FIG. 1, or by a user device, such as user device 102 also shown in FIG. 1. Such posts may be combined into a single set of posts. For example, the set may contain a first posts through an n-th post. Such a set may be associated with a single identifier, such as identifier 222 shown in FIG. 2. It should be understood that the one or more posts may include posts originating from the identifier, such as post 220, and/or may include posts originating from other identifiers to which the relevant identifier, such as identifier 222, replied. In some implementations, the one or more posts may be limited to only the portions of posts with which the identifier is associated, such as main post field 224 and/or a specific reply, without including the content of posts or replies associated with other identifiers. In other implementations, the one or more posts may include the post or replies associated with other identifiers. In some implementations, the one or more posts may include a hyperlink to other content, such as a third-party resource. Such content may be retrieved and included with the corresponding post in the set of posts. In some implementations, receiving the one or more posts may include receiving one or more posts associated with several identifiers. For example, posts may be collected from identifiers associated with specific group, having a specific trait, having a specific account type, etc. In a further implementation, the one or more posts may be received from all identifiers, a subset of identifiers, or a single identifier for a temporal period. For example, all posts from all identifiers for the past 24 hours may be received as a set of posts.

Figure 5:
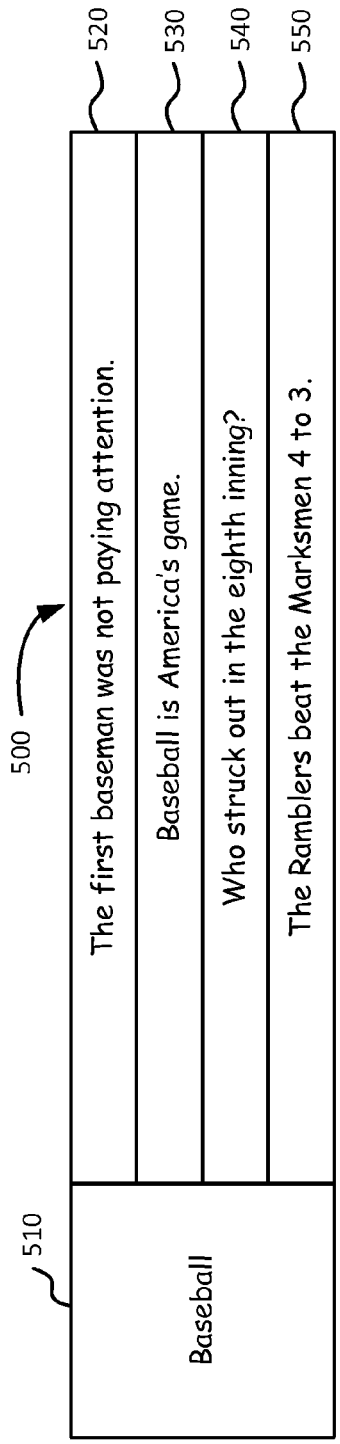
FIG. 5 is an example illustration of a labeled document set associated with an interest identifier.

Process 400 may include adding one or more labeled document sets to the set of posts received (block 404). An example of a labeled document set 500 is shown in FIG. 5. In some implementations, labeled document set 500 includes an interest identifier 510 and one or more entries 520, 530, 540, 550 associated with interest identifier 510. Entries 520, 530, 540, 550 may include text, images, hyperlinks, videos, and/or other content. For example, in the implementation shown in FIG. 5, entries 520, 530, 540, 550 include textual content relating to the interest identifier 510 of baseball. In some implementations, entries 520, 530, 540, 550 may be manually added to the labeled document set 500. In other implementations, entries 520, 530, 540, 550 may be retrieved from a known source associated with interest identifier 510, such as posts from a baseball forum or an existing baseball interest group found on the social network, either manually or through an automated process. In further implementations, additional entries may be added to labeled document set 500 from previously unlabeled posts, such as posts 220, 250 shown in FIG. 2, once the unlabeled posts are determined as pertaining to interest identifier 510, as will be described in greater detail herein. Interest identifier 510 may similarly be manually included or may be automatically set as the title of the group from which entries 520, 530, 540, 550 originated. For example, if entries 520, 530, 540, 550 originated from an existing baseball interest group labeled "Rambler's Baseball Fans," interest identifier 510 may be set as "Rambler's Baseball Fans" or variations thereof. In some implementations, labeled document set 500 may include a predetermined set of keywords relating to a specific interest. For example, such a labeled document set may have an interest identifier of "golf" and may include entries of "golf clubs," "country club," "driver," "iron," "pitching wedge," "bunker," etc. In some implementations, some entries may appear in more than one labeled document set 500. For example, an entry of "That was a great game!" may appear in labeled document sets for sports, baseball, golf, tennis, etc. to which the entry may be associated. Referring back to FIG. 4, an example of adding one or more labeled document sets to the set of one or more posts received may include adding or appending entries 520, 530, 540, 550 of labeled document set 500 to the set of posts that includes posts 220, 250 to form a set of labeled entries and unlabeled posts, such as the set 600 shown in FIG. 6. In some implementations, entries 520, 530, 540, 550 are labeled or are otherwise associated with interest identifier 510 when added to posts 220, 250.

Figure 6:
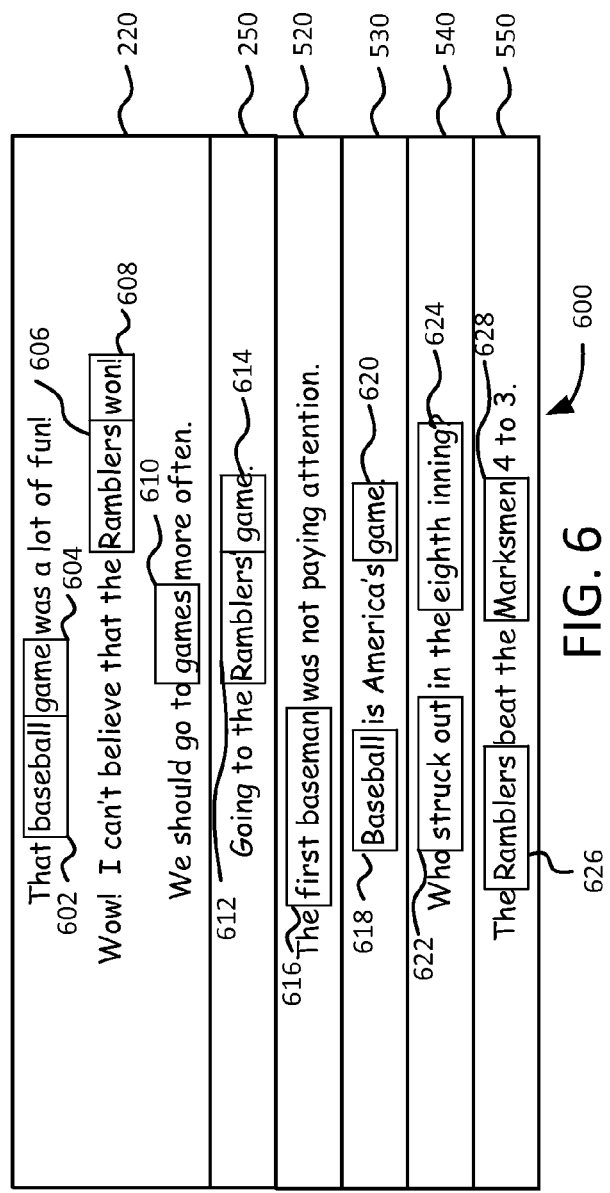
FIG. 6 is an example illustration of a set of posts and labeled entries having keywords extracted.

Process 400 may include extracting keywords from the one or more posts and the one or more entries (block 406). FIG. 6 illustrates an example of such an extraction of keywords from a set 600 containing the one or more posts and the one or more entries. Posts 220, 250 and entries 520, 530, 540, 550 may be textually analyzed to determine one or more keywords present within the content of each. For example, the text of post 220 may be parsed by a server to determine various keywords in the text, such as keywords 602, 604, 606, 608, 610 of "baseball," "game," "Ramblers," "won," and "games," respectively. In one implementation, the text of post 620 may undergo tokenization to divide the content into smaller portions for analysis. A statistical measure of the frequency of a term within a body of text may then be used to determine the top keywords of the text and/or to remove common words (such as "a," "the," etc.). For example, a term frequency-inverse document frequency (TF-IDF) score may be assigned to words within a body of text and used to determine the top keywords identified within the text. Normalization may also be applied to the content of post 220 to normalize numbers, hyperlinks, etc. In some implementations, image recognition may be used to determine one or more keywords associated with a digital image (e.g., an image on a resource viewed by a user using a user device associated with a device identifier, an image shared with a social connection, an uploaded image, etc.). For example, an uploaded image of an automobile may be analyzed using image recognition to determine the keywords of automobiles, cars, driving, etc. In some cases, the image recognition may employ facial recognition. For example, an image of a famous baseball player may be analyzed to determine that keywords such as the name of the specific athlete, sports, baseball, pitcher, etc.

Similar to the extraction of keywords from post 220, keywords 612, 614 of "Ramblers" and "game" may be extracted from post 250. Keyword 616 of "first baseman" may likewise be extracted from entry 520. Keywords 618, 620 of "baseball" and "game" may be extracted from entry 530. Keywords 622, 624 of "struck out" and "eighth inning" may be extracted from entry 540. Keywords 626, 628 of "Ramblers" and "Marksmen" may be extracted from entry 550. Of course other keywords may be extracted from posts 220, 250 and/or entries 520, 530, 540, 550 such as "fun," "first," "baseman," "paying," "attention" "America's," "America," "struck," "out," "eighth," "inning," "beat," "4," "3," and/or "4 to 3." In some implementations, keywords 616, 618, 620, 622, 624, 626, 628 for entries 520, 530, 540, 550 may be predetermined and need not be extracted. In some implementations, process 400 may only extract keywords from unlabeled posts 220, 250.

Referring back to FIG. 4, process 400 may include applying a clustering algorithm to the set of one or more posts and the one or more entries (block 408). In some implementations, the clustering algorithm may include a distributed exchange algorithm. In brief, the distributed exchange algorithm clusters together posts and entries that have similar keywords to maximize the likelihood that clustered posts and entries are related to a common topic. In particular, the distributed exchange algorithm attempts to maximize a mutual information metric, $MI(t_i,d_j)$, which is determined by the following equation:

$$MI(t_i, d_j) = \sum P(t_i, d_j) \log\left(\frac{P(t_i, d_j)}{P(t_i)P(d_j)}\right)$$

where t is the set of keywords in a given document, d is the set of documents in the set, $P(t_i,d_j)$ is the probability distribution of term $t_i$ in a given document $d_j$, and i, j are indexes for the keywords in the set of keywords t and the documents in the set d, respectively. Each post and entry is considered as an individual document in the set d. In short, the higher the mutual information metric score (e.g., the larger the value of $MI(t_i,d_j)$), the more keywords are in common for the documents in a given cluster and the more distinct each cluster is from the other clusters.

For example, in a set of ten posts having three with keywords relating to baseball, three with keywords relating to art, and four with keywords relating to music, if three clusters form having the related posts for these three distinct categories, the mutual information metric will likely have a high score. Conversely, if two clusters are formed, a first cluster having two baseball posts, one art post, and two music posts and a second cluster having one baseball post, two art posts, and two music posts, the mutual information metric will likely have a low score. In some implementations, the clustering algorithm may stop after a predetermined number of iterations (for example, 50 iterations) or the clustering algorithm may stop if the difference between the value of the mutual information metric for the previous iteration and value of the mutual information metric for the next iteration is less than a predetermined value (for example, $\Delta MI(t_i,d_j) \leq 0.0001$).

Figure 7:
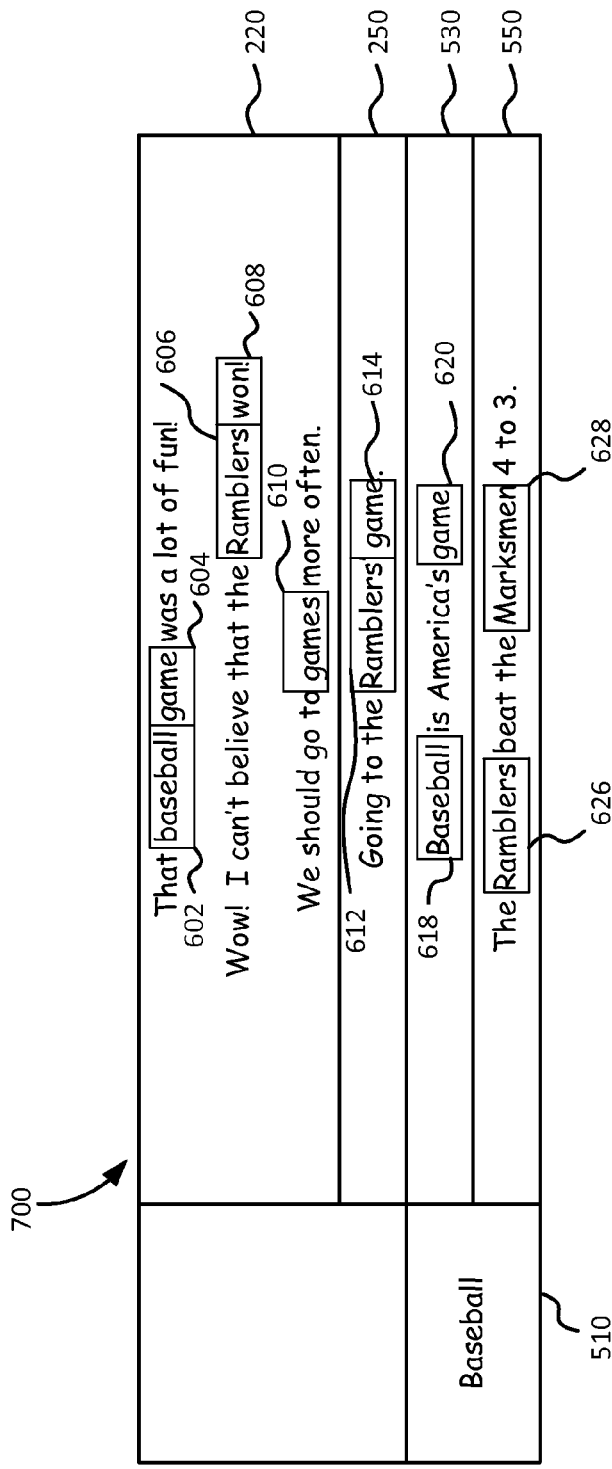
FIG. 7 is an example illustration of a cluster having unlabeled posts and labeled entries.

In some implementations having a number of labeled entries combined with a number of unlabeled posts, the clustering algorithm may result in each cluster having one or more labeled entries and/or one or more unlabeled posts. For instance, referring briefly to FIG. 7, an example of a cluster 700 is shown after applying a clustering algorithm to a set of unlabeled posts 220, 250 and entries 520, 530, 540, 550. In the implementation shown, post 220 includes both the text from main post field 224 and replies 238, 242 as a single document, though this is merely optional. With keywords 602, 604, 606, 608, 610, 612, 614, 618, 620, 626, 628 extracted, the applied clustering algorithm clusters the posts and entries with the highest number of keywords in common. As shown in FIG. 7, keywords 606, 612, 626 refer to the "Ramblers," keywords 604, 610, 614, 620 refer to "game," and keywords 602, 618 refer to "baseball." Thus, posts 220, 250 and entries 530, 550 are likely to be clustered together to form cluster 700 due to the high number of common keywords. Of course it should be understood that cluster 700 is merely an example and other clusters may be formed as a result of applying the clustering algorithm.

Further still, while the foregoing step of applying a clustering algorithm to the set of one or more posts and one or more entries is described in reference to a distributed exchange algorithm, it should be understood that other clustering algorithms may be applied as well. For example, K-means clustering, hierarchical agglomerative clustering algorithms, and/or other clustering algorithms. It should be understood that the application of other clustering algorithms may utilize metrics other than the mutual information metric to maximize the likelihood that clustered posts and entries are related to a common topic.

Referring back to FIG. 4, process 400 may include determining an interest associated with each of the one or more clusters (block 410). In the example described above, once the clustering algorithm is applied to the set, one or more labeled entries and/or one or more unlabeled posts may be included in each cluster. The interest having the highest number of labeled entries in the cluster may be used to determine the interest associated with that cluster. In some implementations, a topic purity metric may be applied to each cluster to determine the strength of the prevalent interest. In brief, the topic purity metric compares the number of labeled entries for a given interest in a cluster against the total number of labeled entries in that cluster. For example, if a cluster has 10 labeled entries, of which 8 relate to baseball, then the topic purity for that cluster would be 0.8 or 80%. More specifically, the topic purity metric can be represented by the following equation:

$$TopicPurity = \frac{\max(LE_t)}{\sum_{t=1}^{n}(LE_t)}$$

where $LE_t$ is the number of labeled entries for a given interest in the cluster, n is the number of different labeled interests, and t is the index for the number of different labeled interests. Max ($LE_t$) returns the interest with the highest number of labeled entries in the cluster. Thus, both the prevalent interest and the purity of that interest for the cluster can be determined. In some implementations, the cluster may be associated with the prevalent interest regardless of the topic purity. In other implementations, the cluster may need to exceed a predetermined topic purity value, such as 80% topic purity, before the cluster is associated with the prevalent interest. If the cluster falls below the predetermined topic purity value, the cluster may be considered a "mixed interest" or "undetermined" cluster.

Process 400 may include associating the one or more unlabeled posts with the determined interest of the cluster (block 412). Once the prevalent interest for a cluster has been determined, the unlabeled posts in the cluster can be associated with that prevalent interest. For example, if the prevalent interest of a cluster is determined as "baseball," the unlabeled posts in that cluster may be associated with the interest of "baseball." An interest may be a single category or may be part of a hierarchy or a hierarchical taxonomy of interests. For example, "baseball" may be a stand-alone interest category or may be part of a hierarchy, such as Entertainment→Sports→Baseball, where baseball is a sub-category of sports, which is, in turn, a sub-category of entertainment. In such an example, the unlabeled posts may be associated with only baseball, with baseball and sports, with baseball, sports, and entertainment, or any combination thereof. In some implementations, such as those including a threshold value for associating a cluster with a prevalent interest, if the threshold value is not met for the cluster, then the unlabeled posts may be associated with "mixed interest" or may remain unlabeled.

Process 400 may also include associating a device identifier with the interest (block 414). As described above, an identifier, such as identifier 222 shown in FIG. 2, may be associated with one or more posts, which may further be associated with the device identifier for a user device. Once the posts are associated with a prevalent interest, as described above, the device identifier may also be associated with the prevalent interest. For example, once posts 220, 250 are associated with the interest of baseball, the device identifier associated with posts 220, 250 may also be associated with the interest of baseball. In some implementations, multiple identifiers may be associated with the prevalent interest if multiple identifiers are associated with posts in the given cluster. For example, referring back to FIG. 2, post 220 may be associated with identifiers 222, 236, 240 for "Jen P.," "Bob Z.," and "Joe B.," respectively. Accordingly, if post 220 is associated with the interest of baseball, identifiers 222, 236, 240 may be associated with the interest of baseball as well. Consequently, the relevant device identifiers associated with identifiers 222, 236, 240 may also be associated with the interest of baseball.

Figure 8:
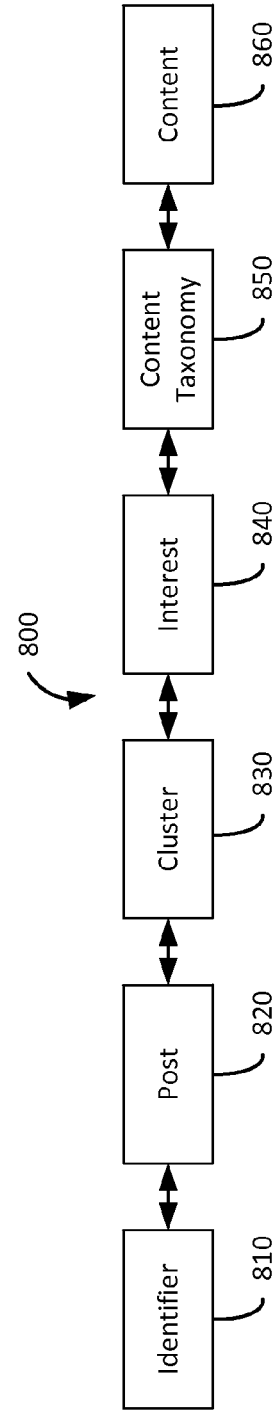
FIG. 8 is an example illustration of a model showing a relationship between an identifier, a post, a cluster based on the post, an interest based on the cluster, a content taxonomy based on the interest, and content based on the content taxonomy.

Process 400 may include selecting content for display on the user device associated with the device identifier based on the associated interest (block 416). Such selection may be based upon a model 800, such as that shown in FIG. 8. Model 800 illustrates that an identifier 810 may be associated with a post 820, which may be associated with a cluster 830, which may be associated with an interest 840, which may be associated with a content taxonomy 850, which may be associated with a content 860. In one implementation, content 860 may be an existing interest group on a social network pertaining to interest 840 that may be selected and recommended for identifier 810. For example, identifier 810 associated with interest 840 of baseball may have content 860 of an interest group pertaining to fans of baseball and/or for a specific team determined to be of relevance to identifier 810. Such a determination may be dependent upon content taxonomy 850 and/or interests 840 associated with identifier 810. For example, if identifier 810 is associated with interests 840 of baseball, soccer, tennis, etc., all of which may be under the broader category of sports in content taxonomy 850, then a content 860 of a more general nature, such as content relating to sports equipment, may be selected.

Figure 9:
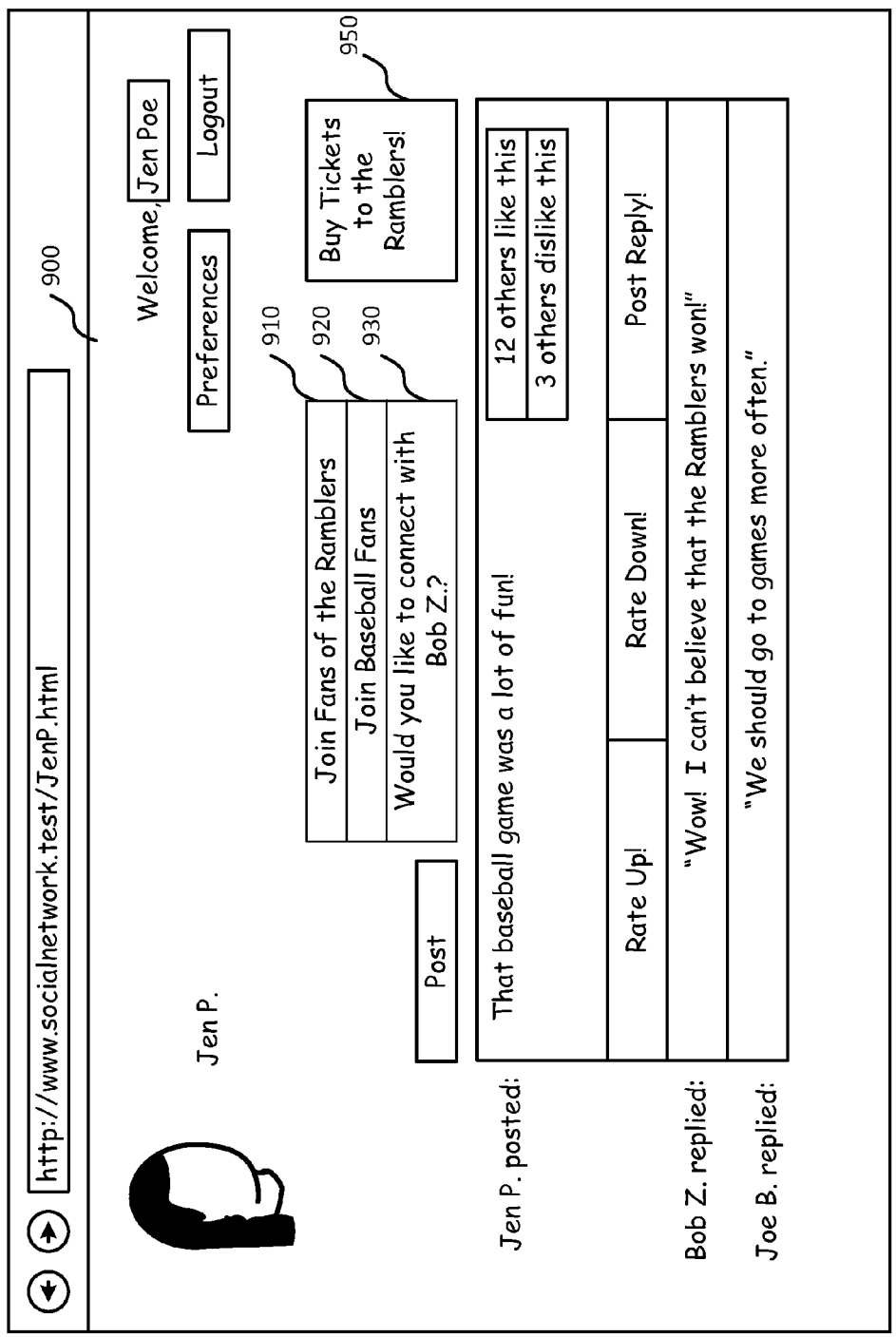
FIG. 9 is an example illustration of an electronic display showing an example resource having recommended interest groups, a recommended associated identifiers, and third-party content.

Such recommendations may be provided as part of a resource, such as via inputs 910, 920 of resource 900 shown in FIG. 9. In response to selection of one of inputs 910, 920, the application displaying resource 900 may cause the user device, such as user device 102 shown in FIG. 1, to transmit data to a remote device via the network, such as network 106 shown in FIG. 1. For example, the user device may transmit data to the content source that provides resource 900 (e.g., content source 108 or 110 shown in FIG. 1) and/or to another server located on the network. In some implementations, input received via resource 900 may be stored locally (e.g., in the memory of the user device). In the implementation shown in FIG. 9, selection of input 910 may associate the identifier with the recommended group. For example, selection of input 910 may associate the identifier for "Jen Poe" with the existing interest group "Fans of the Ramblers." Similarly, selection of input 920 may associate the identifier for "Jen Poe" with the existing interest group "Baseball Fans." In some implementations, the recommendations may be text indicating the identifier may be interested in the recommended existing interest group. In other implementations, the recommendation may take the form of a hyperlink to the existing interest group's social networking resource. Still other actions associated with the recommendation may be presented to the identifier associated with the interest.

In some implementations, content 860 may be a second identifier, such as that of another user, having one or more similar interests 840 that may be recommended to identifier 810 so that the two users of the social network may choose to connect with one another. For example, identifier 810 having an interest in a specific team, such as the Ramblers, may have a second identifier also having an interest in the Ramblers recommended as a new social connection for identifier 810. Such a recommendation may also be provided as part of a resource, such as input 930 shown in FIG. 9. In response, the application displaying resource 900 may cause the user device, such as user device 102 shown in FIG. 1, to transmit data to a remote device via the network, such as network 106 shown in FIG. 1. In the implementation shown in FIG. 9, selection of input 930 may associate the first identifier with the recommended second identifier. For example, selection of input 930 may associate the identifier for "Jen Poe" with the identifier for "Bob Z." It should be understood that any number of other identifiers may be suggested to the first identifier. In some implementations, the recommendation may be text indicating the first identifier may be interested in connecting with the second identifier. In other implementations, the recommendation may take the form of a hyperlink to a social networking resource associated with the second identifier. Still other actions associated with the recommendation may be presented to identifier 810 associated with interest 840.

In yet another implementation, content 860 may be a third-party content item, such as an advertisement or other third-party content item, that may be selected based on identifier 810 being associated with interest 840. For example, a content request from a user device operated by a user and associated with a device identifier may be sent to a content selection server. Such a request may include a device identifier or other form of data used by the server to determine that the request is associated with identifier 810. In such a case, the content selection server may select content 860 from a content taxonomy 850 based, at least in part, on whether content 860 is related to the interest 840. For example, an interest 840 in the baseball team the Ramblers may be determined and a third-party content item to buy tickets to a Rambler's game may be selected to be displayed on the user device associated with identifier 810 when the user device is displaying a resource (e.g., in response to receiving a third-party content request or the like). Such a third-party content item may be provided as part of a resource devoted to the topic (e.g., a resource associated with baseball) or may be provided as part of an unrelated resource. For example, a third-party content item 950 may be included on a social network resource 900 for identifier 810, as shown in FIG. 9. The selection and presentation of the third-party content item may occur in accordance with the process shown and described in reference to FIG. 3 and/or otherwise.

In some implementations, the content selection server may conduct an auction in which different third-party content providers compete to provide relevant content items to identifier 810. In one example case, advertisers may specify which interests 840 on which they wish to bid. For instance, an online retailer of golf equipment may choose to bid in advertisement auctions involving identifiers 810 associated with an interest 840 of golf. In further implementations, the content selection server may select content 860 based on interest 840 and without first receiving a content request (i.e., the content selection server may "push" content 860 to a user device associated with identifier 810). In further implementations, an interest 840 may be used to select or recommend other forms of content 860 for identifier 810. For example, content 860 may include the latest scores for baseball games that may be provided automatically (e.g., without further user action) to identifier 810 associated with an interest 840 in baseball.

In further implementations, an interest 840 may be self-reported by a post, user profile, and/or resource. For example, an interest 840 of a user profile may be explicitly identified by the user. Interest 840 may then be directly associated with identifier 810 for that user and utilized to recommend existing interest groups, similar users, advertisements and/or other third-party content.

In some implementations, once the unlabeled posts are associated with an interest, the unlabeled posts may be added to a corresponding labeled document set. For example, once posts 220, 250 have been associated with the interest of baseball, which corresponds to the interest identifier 510 of labeled document set 500, posts 220, 250 may be appended or otherwise added to labeled document set 500 to enlarge the set and improve the available labeled entries. Thus, the number of labeled entries may expand as a result.

In some implementations, multiple interests 840 may be associated with identifier 810 via process 400. In such instances, interests 840 may be ranked according to the number of posts concerning each interest. For example, a user may have 40 posts about baseball, 5 about art, and 5 about running. Interest 840 may be assigned a higher rank than the interests about art or running due to the high number of posts. Accordingly, content 860 associated with baseball may be more frequently selected. In another implementation, the temporal relationship of the posts may be utilized to also rank interests 840. For example, if the posts by a user about baseball mostly occurred over a year ago and the posts about art and running were more recent, then the interests of art and running may be ranked higher such that content 860 relevant to those more recent interests is presented to the user.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

The term "user device or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code embodied on a tangible medium that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit)

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for several different applications, such as a web browser and several streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A computer-implemented method of associating an interest with a device identifier comprising:
   receiving, by one or more processing systems, a post having one or more first keywords from a social network associated with the device identifier;
   retrieving, by the one or more processing systems, from a source database attributed to one or more interest identifiers, a labeled document including one or more entries, each of the one or more entries including one or more second keywords, each of the one or more entries tagged with the one or more interest identifiers, and each of the one or more entries comprising a previous post stored at the source database;
   extracting, by the one or more processing systems, the one or more first keywords of the post;
   generating, by the one or more processing systems, a first relatedness metric between a first subset of the one or more first keywords of the post with a first subset of the one or more entries of the labeled document;
   generating, by the one or more processing systems, a second relatedness metric between a second subset of the one or more first keywords of the post with a second subset of the one or more entries of the labeled document;
   determining, by the one or more processing systems, that a difference between the first relatedness metric and the second relatedness metric is less than a predetermined threshold;
   generating, by the one or more processing systems, responsive to determining that the difference is less than the predetermined threshold, a post-entry cluster by associating the second subset of the one or more first keywords of the post with the second subset of the one or more entries of the labeled document based on the second relatedness metric between the second subset of one or more first keywords and the second subset of the one or more second keywords, each first keyword of the second subset of the one or more first keywords tagged with the interest identifier of the second subset of the one or more entries associated with the second subset of the one or more second keywords;
   associating, by the one or more processing systems, the post with the one or more entries of the labeled document based in part on the post-entry cluster;
   determining, by the one or more processing systems, a prevalent interest identifier of the post based in part on a number of the one or more interest identifiers of the one or more entries associated with the second subset of the one or more first keywords in the post-entry cluster;
   adding, by the one or more processing systems, the post to the one or more entries of the labeled document for generating a second post-entry cluster, the post tagged with the prevalent interest identifier;
   associating, by the one or more processing systems, the prevalent interest identifier with the device identifier;
   receiving, by the one or more processing systems, a request for content from a client device associated with the device identifier; and
   transmitting, by the one or more processing systems, data to effect display of the content on the client device, wherein the content is selected based, at least in part, on the prevalent interest identifier associated with the device identifier.

2. The method of claim 1, wherein the step of associating the post with the one or more entries comprises applying a distributed exchange algorithm to the post and the one or more entries.

3. The method of claim 1, further comprising:
   determining, at one or more processing systems, a topic purity for the post-entry cluster to determine the prevalent interest identifier.

4. The method of claim 3, wherein the prevalent interest identifier of the post-entry cluster is determined to be a mixed interest responsive to determining that the topic purity for the post-entry cluster is below 80%.

5. The method of claim 1, wherein the content comprises a recommendation of an existing interest group of the social network.

6. The method of claim 1, wherein the content comprises a third-party content item associated with the interest of the post.

7. The method of claim 1, wherein the content comprises a recommendation of a second identifier associated with the social network.

8. The method of claim 1, wherein the post comprises content from a main post field and content from a reply to the main post field.

9. The method of claim 1, wherein the post comprises a hyperlink, wherein the step of receiving the post from the social network associated with the device identifier comprises retrieving linked content associated with the hyperlink.

10. The method of claim 1, wherein the source database comprises an existing interest group on the social network.

11. The method of claim 1, wherein the source database comprises a web page.

12. The method of claim 1, wherein the source database comprises a message board.

13. The method of claim 1, further comprising:
    determining, by one or more processing systems, one or more keywords of each of the one or more entries.

14. A system for selecting content for a device identifier comprising a memory and one or more processors, wherein the memory stores instructions that when executed by the one or more processors, perform operations to:
    receive a post to a social network associated with the device identifier, the post having one or more first keywords;
    retrieve, from a source database attributed to one or more interest identifiers, a labeled document including one or more entries, each of the one or more entries of the labeled document including one or more second keywords, each of the one or more entries tagged with the one or more interest identifiers, each of the one or more entries comprising a previous post stored at the source database;
    extract the one or more first keywords of the post;
    extract the one or more second keywords for each of the one or more entries of the labeled document;

generate a first relatedness metric between a first subset of the one or more first keywords of the post with a first subset of the one or more entries of the labeled document;

generate a second relatedness metric between a second subset of the one or more first keywords of the post with a second subset of the one or more entries of the labeled document;

determine that a difference between the first relatedness metric and the second relatedness metric is less than a predetermined threshold;

generate, responsive to determining that the difference is less than the predetermined threshold, a post-entry cluster by associating the second subset of the one or more first keywords of the post with the second subset of the one or more entries of the labeled document based on the second relatedness metric between the second subset of one or more first keywords and the second subset of the one or more second keywords, each first keyword of the second subset of the one or more first keywords tagged with the interest identifier of the one or more entries associated with the second subset of the one or more second keywords;

associate the post with the one or more entries of the labeled document based, at least in part, on the post-entry cluster;

determine a prevalent interest identifier of the post based in part on a number of the on more interest identifiers of the one or more entries associated with the second subset of the one or more first keywords in the post-entry cluster;

add the post to the one or more entries of the labeled document for generating a second post-entry cluster, the post tagged with the prevalent interest identifier;

associate the prevalent interest identifier with the device identifier; and select content for the device identifier based, in part, on the prevalent interest identifier of the post.

15. The system of claim 14, wherein the operations further comprise operations to apply a distributed exchange algorithm to the post and the labeled document.

16. The system of claim 14, wherein the content comprises a user interest group of the social network.

17. The system of claim 14, wherein the content comprises a second identifier associated with the social network.

18. The system of claim 14, wherein the content comprises a third-party content item associated with the interest of the post.

19. A computer-implemented method for associating interests with device identifiers, comprising:

receiving, by one or more processing systems, a plurality of posts from a social network associated with a device identifier;

retrieving, by the one or more processing systems, from a source database attributed to one or more interest identifiers, a labeled document including a plurality of entries, each entry associated with the one or more interest identifiers, each of the one or more entries comprising a previous post stored at the source database;

extracting, by the one or more processing systems, one or more first keywords from each post of the plurality of posts and one or more second keywords from each entry of the plurality of entries;

generating, by the one or more processing systems, a first relatedness metric between a first subset of the one or more first keywords of the plurality of posts with a first subset of the one or more entries of the labeled document;

generating, by the one or more processing systems, a second relatedness metric between a second subset of the one or more first keywords of the plurality of posts with a second subset of the one or more entries of the labeled document;

determining, by the one or more processing systems, that a difference between the first relatedness metric and the second relatedness metric is less than a predetermined threshold;

generating, by the one or more processing systems, responsive to determining that the difference is less than the predetermined threshold, a plurality of post-entry clusters, each post-entry cluster associating the second subset of the one or more first keywords of the respective post with one or more entries of the labeled document based on the second relatedness metric between the second subset of the one or more keywords and the second subset of the one or more second keywords, each first keyword of the second subset of the one or more first keywords tagged with the interest identifier of the one or more entries associated with the second subset of the one or more second keywords;

associating, by the one or more processing systems, each post with the one or more entries of the labeled document based in part on the plurality of post-entry clusters;

determining, by the one or more processing systems, a prevalent interest identifier of the plurality of posts based in part on a number of the one or more interest identifiers of the one or more entries associated with the second subset of the one or more first keywords in the plurality of post-entry clusters;

adding, by the one or more processing systems, the plurality of posts to the plurality of entries of the labeled document for generating a second post-entry cluster, each of the plurality of posts tagged with the prevalent interest;

associating, by the one or more processing systems, the prevalent interest identifier with the device identifier;

receiving, by the one or more processing systems, a request for content from a client device associated with the device identifier; and transmitting, by the one or more processing systems, data to effect display of the content on the client device, wherein the content is selected based, in part, on the prevalent interest identifier associated with the device identifier.

* * * * *